Figure 1:
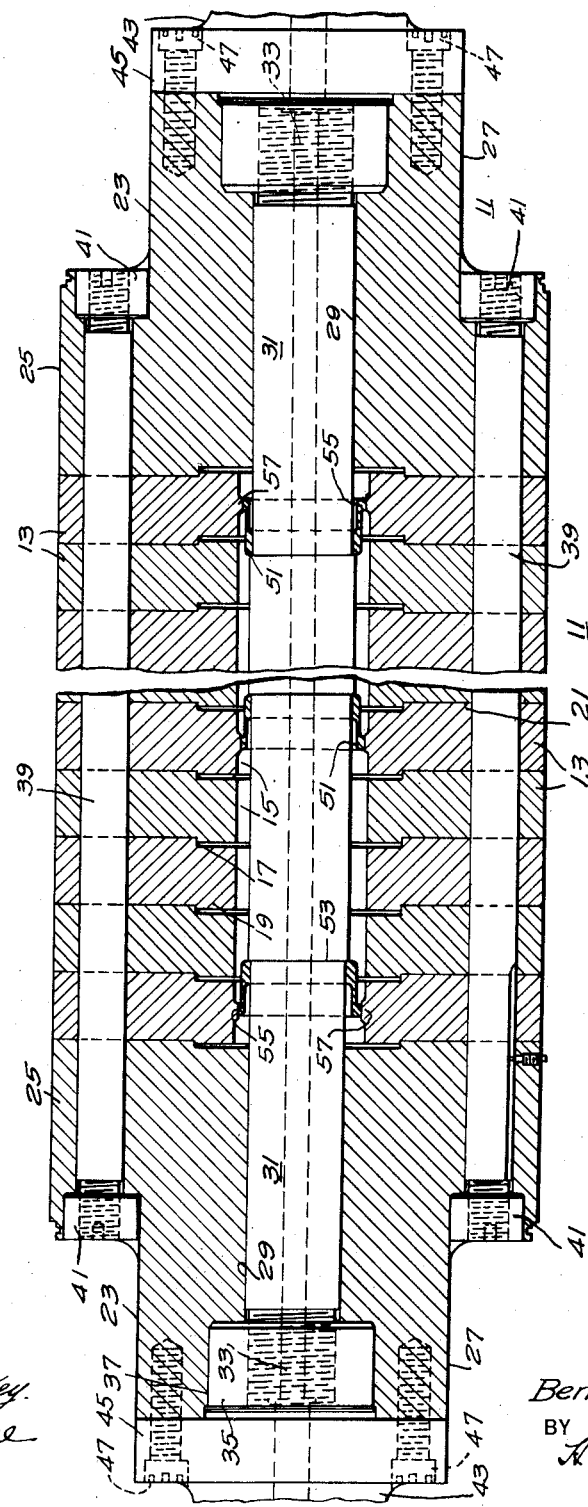

Dec. 15, 1936.  B. A. ROSE  2,064,033
TURBINE GENERATOR ROTOR
Filed Aug. 15, 1934  2 Sheets-Sheet 1

WITNESSES:
E.A. M'Closkey
Phil. C. Groome

INVENTOR
Bennie A. Rose.
BY
H.M. Bielel
ATTORNEY

Dec. 15, 1936.  B. A. ROSE  2,064,033
TURBINE GENERATOR ROTOR
Filed Aug. 15, 1934  2 Sheets-Sheet 2
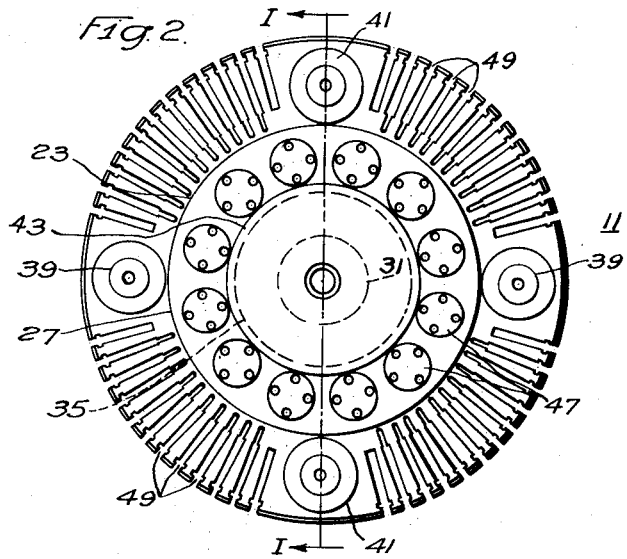
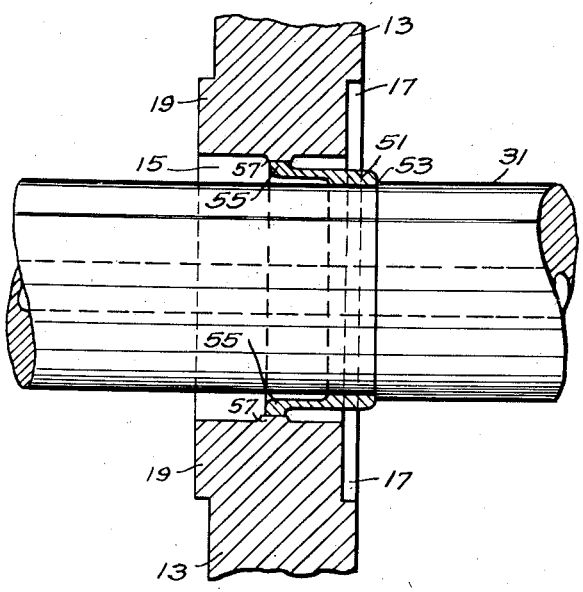
WITNESSES:
INVENTOR
Bennie A. Rose.
BY
ATTORNEY Patented Dec. 15, 1936

2,064,033

UNITED STATES PATENT OFFICE 2,064,033

TURBINE GENERATOR ROTOR

Bennie A. Rose, Swissvale, Pa., assignor to Westinghouse Electric & Manufacturing Company, East Pittsburgh, Pa., a corporation of Pennsylvania Application August 15, 1934, Serial No. 739,915

7 Claims. (Cl. 171—206)

My invention relates to rotating apparatus and particularly to large high-speed turbo-rotors.

An object of my invention is to provide a novel assembly for a high capacity, high speed composite rotor for a turbine drive generator.

Another object of my invention is to provide a composite turbo-rotor assembly that shall have substantially the same mechanical operating characteristics as a solid rotor of the same external dimensions.

Another object of my invention is to provide a built-up rotor assembly having a central clamping bolt extending through a plurality of coaxial discs out of direct engagement with all but the end discs and resilient means to center the bolt relatively to the discs.

Other objects of my invention will either be apparent from a description of a preferred form of device embodying my invention or will be specifically pointed out hereinafter.

In practicing my invention, which as has already been stated, relates particularly to high-speed high-capacity rotors for alternating current generators, I provide a plurality of coaxially aligned relatively thin discs of magnetic material each having a plurality of openings extending therethrough, a relatively heavy end disc being provided at the respective ends of the set of thin discs. I provide a relatively heavy clamping bolt located in an axial opening in the discs, said bolt having direct engagement with the relatively heavy end discs only and being provided with resilient bolt-centering members to maintain the bolt substantially coaxially aligned with the discs. I provide further a plurality of tangentially-spaced clamping bolts inside of the outer periphery of the discs to cooperate with the central clamping bolt to effect a substantially uniform pressure per unit of engaging surface area of the discs, the compression stress being such that the assembled rotor structure will operate substantially the same as would a solid structure of the same dimensions.

In the drawings,

Figure 1 is a view in longitudinal section through a turbo-rotor embodying my invention taken on the line I—I of Fig. 2, Fig. 2 is an end view thereof as seen from the left-hand side of Fig. 1, and Fig. 3 is a fragmentary view mainly in longitudinal section showing the bolt centering means embodying my invention.

In the design of relatively large capacity high-speed turbo-rotors, it is found that the overall length of the active rotor iron becomes relatively large so that the designer is faced with the question of whether a sound solid forging can be made which will have the necessary physical characteristics. The alternative structure is that of a built-up or composite structure embodying a plurality of coaxially aligned relatively thin plates whose magnetic and mechanical strength characteristics can be more accurately controlled and determined. In case the latter kind of assembly is selected the designer is faced with the problem of so assembling these discs as to obtain the mechanical characteristics of a solid rotor.

It has been found possible in medium size rotor structures to obtain the desired rigidity particularly as to bending of the rotor when supported in the two bearings, one at each end of the assembled structure, by the use of bolts located close to and within the periphery of the respective discs. When rotor structures on the order of 60" diameter by 300" length are to be constructed, it is found that the necessary mechanical characteristics cannot be obtained by the use of peripherally located and spaced clamping bolts alone.

Referring to Fig. 1 of the drawings, I have there illustrated a rotor 11 comprising a plurality of relatively thin discs 13 of a suitable high grade magnetizable material having the required high mechanical strength to resist the rupturing stresses acting thereon when rotated at relatively high speed. Without desiring to be limited to any particular dimension, I may say that the thickness of the respective disc 13 may be on the order of 6" to 9" and it will be recognized that this is a thickness which permits of accurate control of all of the characteristics thereof, both physical and magnetic, which are of interest in the operation of the rotor. Each of these discs is provided with a central or axial opening 15 of a predetermined diameter and is provided further with a central recess 17 in one face and a central annular projection 19 on the opposite face whereby the area of the engaging surfaces of two adjacent discs 13 is reduced and is limited to an outer annular portion designated generally by the numeral 21.

In addition to the relatively thin discs 13, I provide a relatively long or heavy end disc 23 at each end of the assembly of the relatively thin discs 13 and each end disc 23 may comprise an inner end portion 25 of substantially the same diameter as the discs 13 and an outer end portion 27 of reduced diameter. The end discs 23 are also provided with a central aperture 29 extending therethrough of somewhat smaller diameter than the apertures 15 in the discs 13.

A central hollow clamping bolt 31 extends through all of the aligned apertures 15 and 29 and its outer diameter is somewhat less than the diameter of the central openings 15 so that normally the outer surface of bolt 31 would be out of direct engagement or contact with the inner wall of the central or axial openings provided in the respective thin discs. Each end portion of clamping bolt 31 is provided with a screw threaded portion 33 upon which an internally screw threaded nut 35 may be mounted, each end disc 23 being provided with a recess 37 in its outer end to receive the nut 35.

I provide further a plurality of outer clamping bolts 39 located in suitable openings, here shown as four in number, extending through the discs and located within and adjacent to the outer periphery of the discs. Nuts 41 are provided in the usual manner having screw threaded engagement with the outer ends of the clamping bolts 39.

I have shown bearing shaft extensions 43 having flange portions 45 at their inner ends, which are adapted to be bolted against the outer ends 27 of end discs 23 by a plurality of short relatively heavy machine bolts 47.

The rotor is provided with a plurality of slots 49 in its outer peripheral surface and it is to be understood that a proper number of such slots, each of the proper size to receive a field winding, is provided and that a field winding is located therein, in a manner well known in the art. The rotor shown in the drawings is one which is so constructed and wound as to provide four poles, so that when it is operated at 1800 R. P. M. in cooperation with the properly designed stationary armature winding (not shown in the drawings), a 60 cycle current will be generated.

It is obvious that the outer bolts 39 uniformly distributed peripherally of the rotor and adjacent to its outer surface will provide an outer clamping stress but it is further obvious that the effect of these clamping bolts will not extend to the inner edge of the respective discs adjacent to the openings 15. In order, however, to provide means to effect a clamping stress on the discs adjacent their inner peripheries, the central axial aperture has located therein the shaft 31, although this shaft is out of direct operative engagement with any but the end discs. This operative engagement is effected between the inner face of the clamping nuts 35 and the shoulder portion of the axial recess 37 engaged thereby. However, the length of the end discs 23 is made such that the compressive stresses are transmitted substantially axially to the relatively thin discs 13 and in such manner that when the compressive stresses effected by the central clamping bolt are combined with the compressive stress effected by the outer clamping bolts a substantially uniform compressive stress is obtained.

It has been found necessary to obtain a predetermined minimum compressive stress per unit area of engagement of the adjacent discs if it is desired to have the built-up rotor operate in substantially the same manner, mechanically speaking, as would a solid rotor and this value of compressive stress may be stated to be approximately 7000 lbs. per square inch. The diameter of the recess 17 and of the projection 19 on the thin discs is, therefore, made such that when the total effective contact area of the discs is calculated, the stress thereon will be substantially 7000 lbs. per square inch or more, which results in a rotor which has substantially the same mechanical operating characteristics as a solid rotor.

It is, of course, evident that when a structure of this kind is supported by two bearings spaced apart on the order of 360", the rotor will bend to a certain limited extent, acting in this particular respect the same as would any beam when subjected to the same conditions. It has been found that the central clamping bolt 31 when made with a diameter substantially less than the diameter of the openings 15 and 29 in the discs will have entirely different mechanical or bending characteristics which characteristics appear to be substantially independent of the tension stress caused therein by tightening up on the nuts 35 located at the ends thereof. This bolt would sag enough in the central openings 15 to rest upon that part of the wall of the discs which is at the bottom at any instant of time. In other words, when rotating, this shaft might whip and cause trouble. In order to overcome this trouble, I provide a plurality of resilient tubular bolt-centering members 51 which are shown more particularly in Fig. 3 of the drawings. I provide a plurality of such clamping bolt centering means having one end portion of the tubular member fitting tightly on the shaft 31 adjacent a shoulder 53 thereon. The other end portion 55 has a short annular flange, substantially as shown in Fig. 3 of the drawings, which is adapted to engage an inner peripheral or annular flange 57 on a disc 13, the inner dimension of the annular lug 57 and the outer dimension of the flange at the end 55 being such that an initial compressive stress is active upon the bolt centering means.

The method of assembly of a rotor structure of this kind may be briefly described as follows. Let it be assumed that the right-hand end disc 23 is located on a substantially horizontal plane surface and that the axial clamping bolt 31 with the right-hand nut 35 thereon is also located in its proper operative position relatively to this end disc. The left-hand end of the clamping bolt may be supported by a removable temporary support, not shown in the drawings. It is to be understood that the bolt centering members 51 are located on the clamping bolt 31 and it may here be pointed out that for assembly reasons alone the right-hand end of the bolt 31 is made slightly larger than the left-hand end, a shoulder 53 of the kind shown in Fig. 3 being provided at that part of the shaft which is to receive one of the bolt centering members 51. It is thus possible to locate the bolt centering members 51 in proper sequence on the bolt without the necessity of forcing the one on the right-hand end over substantially the greater part of the length of the shaft which would be necessary if the shaft diameter were substantially the same throughout its entire length.

Any suitable means for assuring that the openings adapted to receive the outer bolts 39 are properly axially alined may be used, such as a short plain stud fitting closely within one of the openings 39 and easily movable therein. The right-hand disc 13 is then moved to its proper operative position adjacent to the inner end of the end disc 23 and it will be obvious that if it is provided with an inner annular flange or projection 57, it will be relatively easy to force it over the bolt centering member 51.

Other of the thin discs 13 are then located in adjacent side-by-side and interfitting relations as substantially as shown in Fig. 1 of the drawings, the proper discs 13 with the inner flanges 57 being provided in proper sequence and location to cooperate with the respective axially spaced bolt-centering members 51. The left-hand end disc 23 is then located against the left-hand disc 13 of the series and the left-hand clamping nut 35 may then be applied and tightened to a small degree. The clamping bolts 39 may also be put in place and the nuts 41 applied thereto.

In an actual installation calculation showed that a compressive force of 1,250,000 pounds was desired to be effected by each of the outer bolts 39, while the inner or axial clamping bolt 31 should exert a compressive force on the order of 4,500,000 pounds so that the desired clamping or compressing stress on the disc surfaces should be obtained. It was found substantially impossible to obtain this clamping force in the bolt by mechanically turning one or the other of the nuts 35 and the bolt 31 was made hollow for the purpose of permitting a heating fluid, such as steam, to flow therethrough in order to raise the temperature of the bolt and to cause its expansion, particularly in a longitudinal direction. The amount of expansion necessary to obtain a predetermined tension stress in the bolt and the corresponding compressive force on the discs was calculated and suitable measuring devices were applied to the bolt during the operation of causing the heating fluid to flow through the hollow central clamping bolt. When the desired expansion had been reached, it was only necessary to turn the nut 35 at one end of the bolt until it bottomed against the shoulder of recess 37 and then permit the clamping bolt to cool.

It was further possible to use ordinary mechanical means to tighten the nuts 41 on the outer clamping bolts 39 to obtain the desired compressive stresses in each of the bolts.

It is obvious that the shaft 31 will not only expand longitudinally thereof while being heated but that it will also expand radially thereof, and it is further obvious that the bolt centering members 51 will also be heated, since they are in close and direct contact with the outer surface of shaft 31, although they will probably not reach as high a temperature as does the main portion of shaft 31. Since the members 51 are so designed as to be resilient, no unduly high stresses will be caused in these bolt-centering means by the hereinbefore described heating of the bolt 31.

It is obvious that whatever expansion of the assembly in all directions may be caused by the temperature rise thereof, because of the losses therein during operation, will be partaken of by substantially all of the different elements so that within reasonable limits the originally determined compressive stresses will be effective under all conditions of operation.

It was hereinbefore stated that a clamping bolt of the kind indicated by numeral 31 which may be on the order of 12″ or more in diameter would act as a substantially independent beam when its external diameter was slightly less than the internal diameter of the axial openings within which it is located but the bolt centering members 51 will operate to hold the bolt substantially central in the openings 15 so that whipping of this shaft during operation thereof does not occur.

The structure embodying my invention thus provides a relatively simple means for obtaining the necessary mechanical strengths in a built up high-capacity, high-speed turbo-rotor without stressing any part of the assembly beyond safe limits. The device embodying my invention further provides means for causing the mechanical characteristics of a built up turbo-rotor to be substantially the same as that of a solid rotor while permitting closer control of all of the characteristics of the component parts because of their relatively smaller dimensions in at least one direction.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. A turbo-rotor assembly comprising a plurality of coaxial discs each having a central opening therethrough, a clamping bolt extending through the central opening and having a smaller area of cross section than the central opening and bolt centering means in the space between the bolt and the wall of the central opening.

2. A turbo-rotor assembly comprising a plurality of coaxial discs each having a central opening therethrough, a clamping bolt extending through the central opening and having a smaller area of cross section than the central opening and resilient bolt centering means in the space between the bolt and the wall of the central opening.

3. A turbo-rotor assembly comprising a plurality of coaxial discs each having a central opening therethrough, a clamping bolt extending through the central opening and having a smaller area of cross section than the central opening and a plurality of resilient tubular bolt centering means in the space between the bolt and the wall of the central opening.

4. A turbo-rotor assembly comprising a plurality of coaxial discs each having a central circular opening therethrough, a clamping bolt of less diameter than the opening in the disc located therein and a plurality of resilient tubular bolt-centering members on the clamping bolt.

5. A turbo-rotor assembly comprising a plurality of coaxial discs each having a central circular opening therethrough, a clamping bolt of less diameter than the opening in the discs located therein and a plurality of resilient tubular bolt-centering members on the clamping bolt, the place of engagement of the bolt-centering members with the bolt being displaced axially relatively to the place of engagement of the bolt centering members with the discs.

6. A turbo-rotor assembly comprising a plurality of coaxial discs each having a central opening therethrough, a clamping bolt extending through the alined central openings and having a smaller area of cross section than said openings and initially compressively stressed bolt-centering means in the space between the bolt and the wall of the central opening in a disc.

7. A turbo-rotor assembly comprising a plurality of coaxial discs each having a central opening therethrough, a clamping bolt extending through the alined central openings and having a smaller area of cross section than said openings and initially compressively stressed resilient tubular bolt-centering means in the space between the bolt and the wall of the central opening in a disc.

BENNIE A. ROSE.